Sept. 8, 1964      S. F. SKALA      3,148,279
RADIATION METHOD OF MEASURING SHEATH THICKNESS AND ECCENTRICITY
Filed May 4, 1961
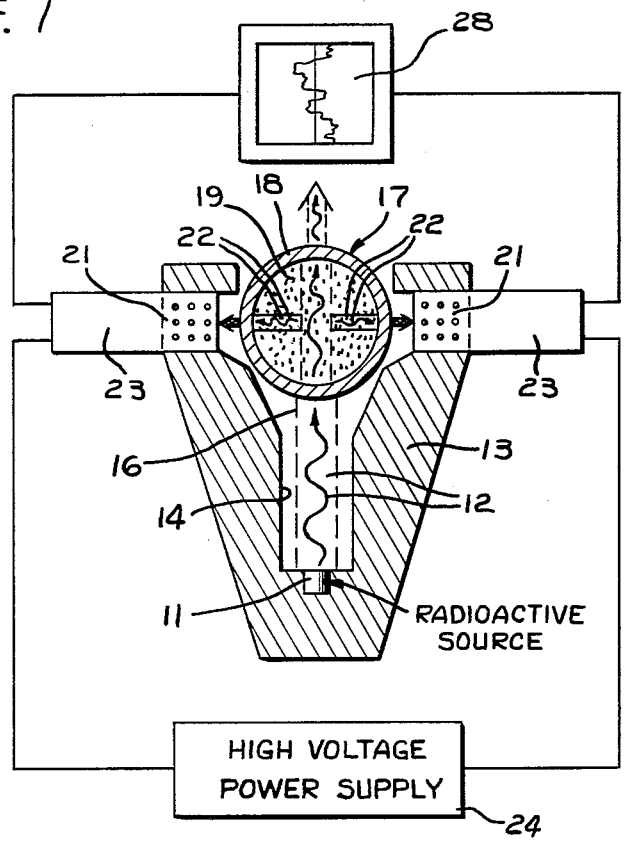
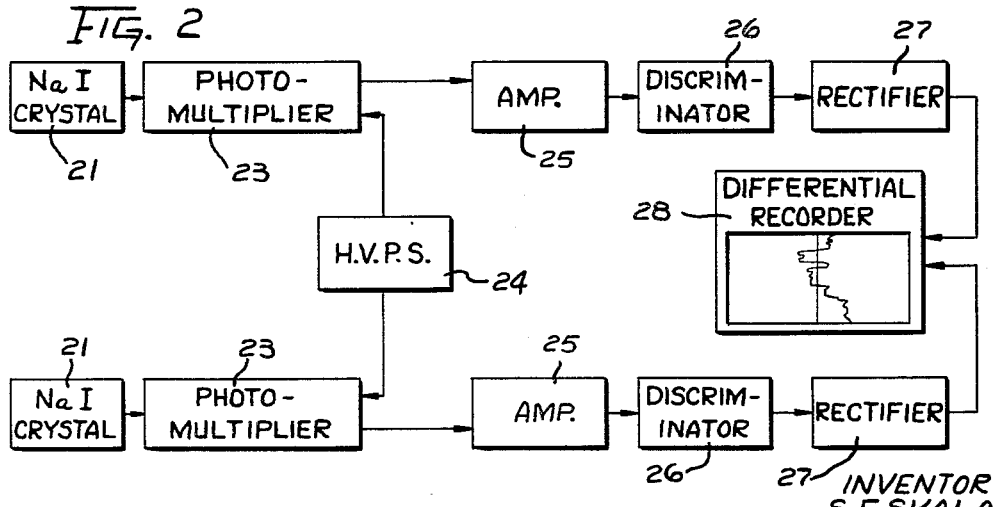
INVENTOR
S. F. SKALA
BY J. L. Landis
ATTORNEY

United States Patent Office 3,148,279
Patented Sept. 8, 1964

3,148,279
RADIATION METHOD OF MEASURING SHEATH THICKNESS AND ECCENTRICITY
Stephen F. Skala, Glen Ellyn, Ill., assignor to Western Electric Company, Incorporated, a corporation of New York
Filed May 4, 1961, Ser. No. 107,718
4 Claims. (Cl. 250—83.3)

The present invention relates generally to radiation methods of measuring the thickness of a predominantly radiation-absorbent tubular sheath enveloping a core of predominantly radiation-scattering material at a point on the periphery of the sheath, and more particularly to the utilization of such methods to measure the eccentricity of a lead sheath on a moving lead-sheathed cable.

Many radiation techniques for measuring thickness are already known. Arrangements such as aligning a radioactive source with a detector on the opposite side of an article, aligning a radioactive source enclosed in a hollow article with a detector outside of the article, or positioning a radioactive source and a detector on the same side of an article have been employed to measure the thickness of flat sheets and hollow tubes. However, no such arrangements are presently known which will permit measuring the thickness of a tubular sheath enveloping a core.

Accordingly, the general objects of the invention are to provide new and improved methods of measuring the thickness of a predominantly radiation-absorbent tubular sheath enveloping a core of predominantly radiation-scattering material at a point on the periphery of the sheath from outside the sheathed core.

In the manufacture of multiwire communications cable, a lead sheath is extruded on cables designated for hazardous use to prevent damage of the cable core. In order to accomplish this protective purpose, it is necessary that at least a minimum thickness of the sheath be maintained around the entire core. Occasional shifting of the extruder die and occasional differences in the temperature of the lead make this requirement difficult to uphold since the resulting sheath becomes eccentric.

Accordingly, more specfic objects of the invention are to provide new and improved methods of measuring the eccentricity of a lead sheath on a moving lead-sheathed cable.

In the past, thickness and eccentricity measurements were made by extruding 50 to 60 feet of just the hollow lead tube and measuring the tube with mechanical gages in a laboratory. With the results of this measurement, the extruder die and the lead temperature were adjusted to the proper settings. This method is considered inadequate because of the rather long time required to perform the measurement and the amount of extruded lead tubing wasted. In addition, no continuous indication of the eccentricity or thickness could be obtained while lead was being extruded on the cable without shutting down the extruder, in which case the cable would have to be severed and irreparably damaged. Furthermore, because such measurements could not be responded to promptly and the extruder adjusted accordingly, excess sheathing material had to be applied to insure that the minimum thickness requirement would be met, resulting in a costly waste of material.

Therefore, additional objects of the invention are to provide improved methods of measuring the thickness and eccentricity of a lead sheath on a moving lead-sheathed cable which will not damage the cable and which can be utilized immediately after the sheath has been extruded on the cable so that departures from the desired thickness and concentricity may be promptly compensated for.

With the foregoing and other objects in mind, and in accordance with certain aspects of the invention, a beam of intermediate energy range photons is directed toward the center of a core of predominantly radiation-scattering material enveloped by a tubular sheath of predominantly radiation-absorbent material along a line not coincident with a point on the sheath to be measured. This beam penetrates the sheath and enters the core where it is scattered resulting in lower energy radiation directed at all angles to the initial beam. The intensity of the scattered radiation is attentuated by an amount dependent upon the thickness and atomic number of the sheath penetrated as the radiation exits from the sheathed core. The scattered radiation directed through a small area encompassing the point to be measured is received by a detector, which provides a measure of the thickness of the sheath at that point.

According to certain more specific aspects of the invention, the eccentricity of a lead sheath on a moving lead-sheathed cable is measured by directing a beam of intermediate energy range gamma rays emitted by a radioactive isotope toward the center of the moving cable. The initial beam penetrates the sheath and is scattered resulting in lower energy gamma rays which are attenuated as they exit from the cable. The attenuated intensities of only those scattered gamma rays which are directed at right angles to the initial beam are measured on either side of the cable. The difference of the indicated intensities is correlated as a measure of the difference in thickness of the lead sheath on opposite sides of the cable, hence as a measure of the eccentricity of the lead sheath.

Other objects, advantages and aspects of the invention will appear from the following detailed description of a specific embodiment thereof, when taken in conjunction with the appended drawings, in which:

FIG. 1 is a front view, partly in section, of an eccentricity detector for lead-sheathed cable; and FIG. 2 is a block diagram of an electrical comparator circuit for indicating the eccentricity of the cable.

In order to provide a more complete understanding of the invention, a brief description will first be given of two basic principles of the nuclear physics which are utilized in the invention. The first is the Compton effect (Compton scattering) which is the dominant effect for photons of the intermediate energy range, 0.1 to 5 m.e.v. Such a photon interacts with an atomic electron, which has a binding energy small in comparison with that of the photon, giving some of its energy to the electron and proceeding with lower energy and altered course. This interaction may be treated as an elastic collision between the photon and the electron, which satisfies the laws of conservation of energy and momentum. From these laws may be derived the well-known relation between the energy and angle of scattered radiation, given in "Nuclear Engineering Handbook" by Harold Etherington, pages 7–61, as:

$$E^1 = \frac{E}{1 + (1 - \cos\theta)E/0.51}$$

where E is the initial photon energy in m.e.v., $E^1$ is the energy of the scattered photon also in m.e.v., and $\theta$ is the angle between the incident and scattered photon. The probability of scattering may be found from tables and graphs based upon the Klein-Nishina equation shown in "Beta and Gamma-Ray Spectroscopy" by Kai Siegbahn, pages 33–35.

The second basic principle is the photoelectric effect, which is the dominant effect for low energy photons, below about 0.5 m.e.v. Some overlapping of intermediate energy range and lower energy photons exists, and the distinction is relative and is based on the atomic number of the material under consideration. Such a photon gives all of its energy to an electron, causing the ejection of an electron from an inner orbit. As a result, the photoelectric effect can be accurately treated as an absorption process. Values of the rate of absorption are tabulated as a function of photon energy and can be found in "Nuclear Engineering Handbook" mentioned hereinabove.

Referring now in detail to the drawings and particularly to FIG. 1, there is illustrated one specific embodiment of the invention which utilizes both the Compton and photoelectric effects. A radioactive isotope source 11, preferably $Cs^{137}$, emitting intermediate energy range gamma rays 12—12 is enclosed in a lead shield 13. The lead shield 13 is provided with an opening 14 for directing a beam 16 of the gamma rays 12—12 toward the center of a moving lead-sheathed cable 17. The beam 16 penetrates the lead sheath 18 without being deleteriously attenuated because the energy of the gamma rays 12—12 is greater than the low energy in which the photoelectric effect is dominent. Instead, the beam 16 enters the core 19 of the cable 17 where it is Compton scattered resulting in lower energy gamma rays directed at all angles to the initial beam 16 since this effect is dominant for the intermediate energy range photons selected. While the beam of gamma rays is attenuated as it initially penetrates the lead sheath, the amount of attenuation is so small that the initial intensity of the gamma ray beam may be utilized to calculate the initial intensity of the scattered gamma rays as they exit from the cable in accordance with established expressions known in the art.

The intensity of the scattered gamma rays, because of their lower energy, is significantly attenuated by an amount dependent upon the thickness of the lead sheath 18 (and by the atomic number, which is constant in any given application) penetrated as the scattered gamma rays exit from the cable 17. The ratio of the attenuated intensity of the scattered radiation to the initial intensity thereof, thus provides a measure of the thickness of the sheath penetrated by such scattered radiation. A pair of radiation detectors 21—21 (preferably sodium iodide, thallium-activated crystal detectors) positioned at right angles to the initial beam 16, one on either side of the cable 17, receive only those gamma rays 22—22 which are scattered in these directions and are directed through a small area illustrated which encompasses each point to be measured. The detectors 21—21 provide a measure of the attenuated intensities of the scattered gamma rays 22—22 by emitting light pulses proportional in number to the attenuated intensities.

Referring now to FIG. 2, there is illustrated a preferred comparator circuit for indicating the eccentricity of the lead sheath 18 in the embodiment of the invention illustrated in FIG. 1. The comparator circuit includes a pair of photomultipliers 23—23, one associated with each detector 21 and energized from a high voltage power supply 24. Each photomultiplier 23 is designed for converting the light pulses emitted by the associated detector 21 into electrical pulses, which are built up in an associated amplifier 25 and are fed to an associated discriminator 26 where low energy background signals are eliminated. An associated rectifier 27 changes each discriminator output to a representative direct-current signal. A differential recorder 28 common to both branches of the comparator circuit receives the direct-current signals from each rectifier 27 and correlates their difference as a measure of the difference in thickness of the sheath 18 on opposite sides of the cable 17, hence as a measure of the eccentricity of the lead sheath 18.

The subject methods and apparatus are very versatile and have many applications other than the specific eccentricity test constituting the preferred embodiment. In addition to measuring the eccentricity of the sheath 18, the amount of attenuation of the intensity indicated by the detectors 21—21 can be correlated individually as a measure of the thickness at the corresponding point on the cable sheath, thereby providing a spot check of the minimum thickness requirement. The apparatus is also compact enough to be rotated about the moving cable 17, thus enabling eccentricity measurements to be made at various points on the periphery of the sheath.

Where only thickness, and not eccentricity, is to be measured, the angle at which the scattered radiation is measured need not necessarily be limited to 90° to the initial beam 16, since the scattered radiation is in all directions. The attenuated scattered radiation may be detected simultaneously at a plurality of spaced points around a single circumference which, after correction for the angle of scattering, provides a composite indication of the thickness of the sheath 18 all around the core 19.

While not specifically illustrated, it is obvious that the detector circuits may readily be adapted to include a control device which is responsive to the rectifier outputs and which feeds back a signal to control the extruder so as to correct the thickness and concentricity in accordance with detected deviations.

While one specific embodiment of the invention has been described in detail hereinabove, it will be obvious that various modifications may be made from the specific details described without departing from the spirit and scope of the invention.

What is claimed is:

1. The method of measuring the thickness of a predominantly radiation-absorbent, tubular sheath enveloping a core of predominantly radiation-scattering material at a point on the periphery of the sheath, which comprises the steps of directing a beam of intermediate energy range photons toward the center of the core along a line not coincident with the point to be measured, which beam penetrates the sheath with no significant attenuation and enters the core where it is scattered resulting in lower energy radiation directed at all angles to the initial beam, the intensity of the scattered radiation being attenuated because of its lower energy by an amount dependent upon the thickness and atomic number of the sheath penetrated as the radiation exits from the sheathed core; and measuring the attenuated intensity of the scattered radiation directed through a small area encompassing the point to be measured to provide a measure of the thickness of the sheath at that point.

2. The method as recited in claim 1, wherein the attenuated intensities of the scattered radiation directed through a plurality of spaced points around a single circumference are measured simultaneously to provide a composite indication of the thickness of the sheath all around the core.

3. The method of measuring the eccentricity of a predominantly radiation-absorbent, tubular sheath enveloping a core of predominantly radiation-scattering material, which comprises the steps of directing a beam of intermediate energy range photons toward the center of the core, which beam penetrates the sheath with no significant attenuation and enters the core where it is scattered resulting in lower energy radiation directed at all angles to the initial beam, the intensity of the scattered radiation being attenuated because of its lower energy by an amount dependent upon the thickness and atomic number of the sheath penetrated as the radiation exits from the sheathed core; and measuring the attenuated intensities of the scattered radiation directed at right angles to the initial beam on either side of the sheathed core to provide a measure of the difference in thickness of the sheath on opposite sides of the core, hence a measure of the eccentricity of the sheath.

4. The method of measuring the eccentricity of a lead sheath on a moving lead-sheathed cable, which comprises the steps of directing a beam of intermediate energy range gamma rays toward the center of the moving cable, which beam penetrates the sheath with no significant attenuation and enters the core of the cable where it is scattered resulting in lower energy gamma rays directed at all angles to the initial beam, the intensity of the scattered gamma rays being attenuated because of its lower energy by an amount dependent upon the thickness of the lead sheath penetrated as the scattered gamma rays exit from the cable; measuring the attenuated intensities of the scattered gamma rays directed at right angles to the initial beam on either side of the cable; and correlating the difference of the indicated intensities as a measure of the difference in thickness of the lead sheath on opposite sides of the cable, hence as a measure of the eccentricity of the lead sheath.

References Cited in the file of this patent

UNITED STATES PATENTS

| | | |
|---|---|---|
| 2,298,942 | Hicks et al. | Oct. 13, 1942 |
| 2,316,239 | Hare | Apr. 13, 1943 |
| 2,525,292 | Fua et al. | Oct. 10, 1950 |
| 2,903,590 | Somerville | Sept. 8, 1959 |
| 2,997,586 | Scherbatskoy | Aug. 22, 1961 |